Patented Nov. 28, 1922.

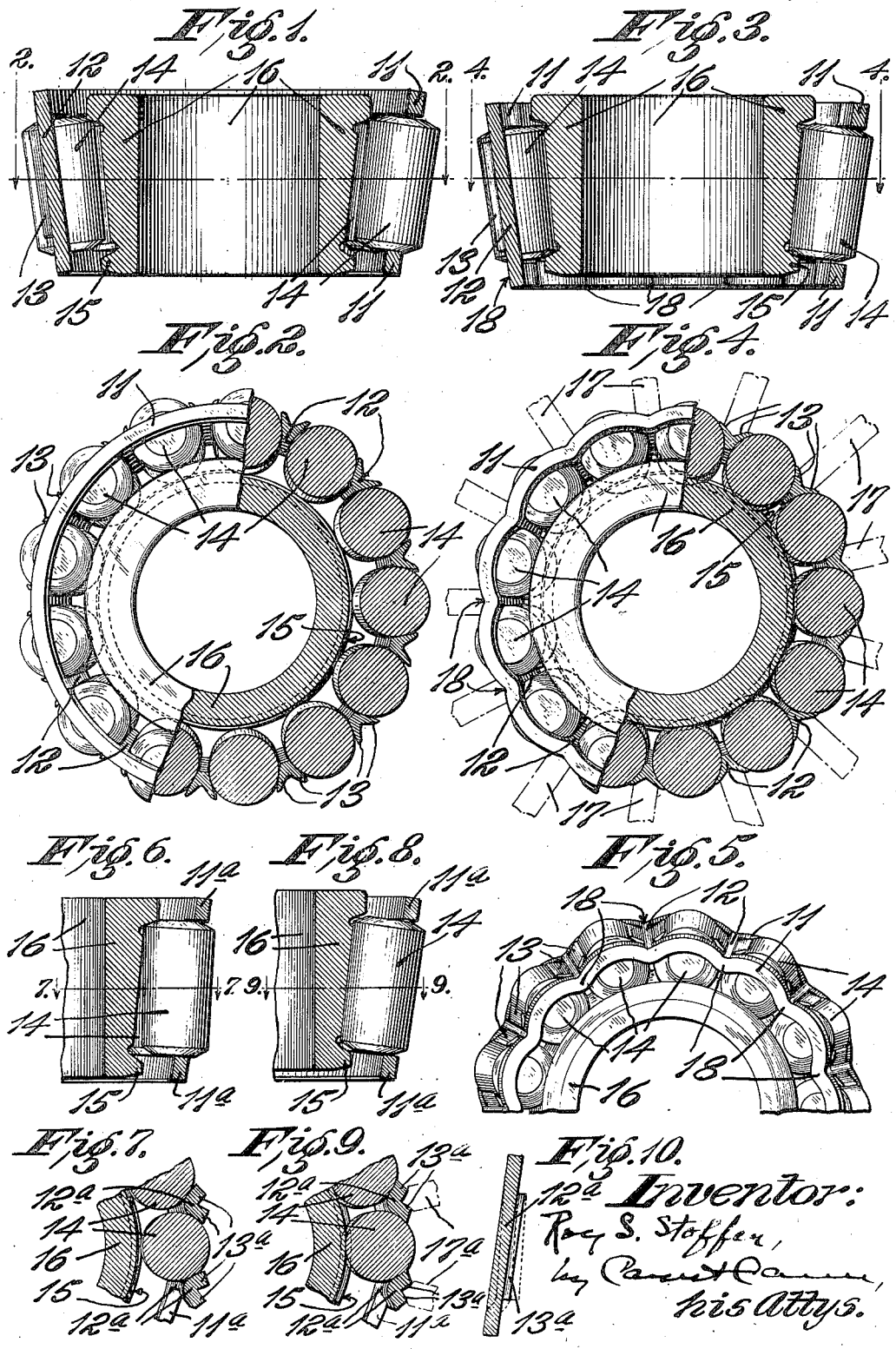

1,436,734

UNITED STATES PATENT OFFICE.

ROY S. STOFFER, OF CANTON, OHIO. ASSIGNOR TO THE TIMKEN ROLLER BEARING COMPANY, OF CANTON, OHIO, A CORPORATION OF OHIO.

PROCESS OF CLOSING IN ROLLER BEARINGS.

Application filed August 1, 1921. Serial No. 488,857.

*To all whom it may concern:*

Be it known that I, ROY S. STOFFER, a citizen of the United States, and a resident of the city of Canton, in the county of Stark and State of Ohio, have invented a new and useful Improvement in Processes of Closing in Roller Bearings, of which the following is a specification.

My invention relates to roller bearings and processes of assembling them. One of its principal objects is a devise a cage that will accommodate a larger number of rollers than cages of the kind now commonly used and that will be simple in construction and easy to manufacture. Another principal object is to devise a process of assembling rollers that will correct misalinement of the bridges of the cage and that will conform the bridge-wings to the rollers. The invention consists principally in the cage hereinafter described and claimed. The invention further consists in conforming the wings or marginal portions of the bridges of the cage to the rollers during the assembling operation so as to form pockets for said rollers, and also in correcting any misalinement of the bridges of the cage during such operation.

In the accompanying drawing wherein like symbols refer to like parts wherever they occur, Fig. 1 is a vertical section through a roller bearing embodying my invention prior to the closing in of the retaining cage;

Fig. 2 is a top view thereof partly in horizontal section on the line 2—2 in Fig. 1;

Fig. 3 is a vertical section through the bearing after the closing in of the retaining cage;

Fig. 4 is a top view thereof partly in section on the line 4—4 in Fig. 3;

Fig. 5 is a fragmentary end view of the assembled bearing;

Fig. 6 is a fragmentary section through one side of a roller bearing having a slightly modified form of retaining cage whose bridges are bowed outwardly longitudinally to permit assembling of the bearing;

Fig. 7 is a horizontal section thereof on the line 7—7 in Fig. 6;

Fig. 8 is a view similar to Fig. 6, after the closing in of the bridges;

Fig. 9 is a horizontal section thereof on the line 9—9 in Fig. 8; and

Fig. 10 is a longitudinal section through one of the bridges of the cage shown in Figs. 6 to 9 showing the position of the bridges before and after the closing in operation in dotted lines and in full lines, respectively.

The cage shown in Figs. 1 to 5 of the drawing comprises annular end members 11 that are connected by longitudinally disposed bridge members 12 integral therewith. The marginal portions of said bridges are flanged or provided with wings or flaps 13 which constitute the side walls of the pockets for the rollers 14.

The process of assembling the bearing shown in Figs. 1 to 5 is as follows: The cage is formed by any suitable method with its annular end members 11 of a diameter sufficient to locate the bridges 12 far enough from the center of the bearing to enable the rib 15 on the smaller end of the inner bearing cone 16 to clear the smaller ends of the rollers; and if the bridges 12 have flaps 13 thereon, the flaps of each bridge are brought comparatively closer together, thus making larger pockets than are desired in the assembled bearing. The rollers 14 are then inserted in the pockets of the cage and the ribbed cone or inner bearing member 16 is forced endwise thereof, as shown in Figs. 1 and 2. The assembled bearing is placed in a die (not shown) which is provided with concave recesses adapted to engage the rollers. Radially disposed plungers or formers 17 are arranged in slots provided therefor in the die block. Said plungers are equal in number to the bridges of the cage and are arranged in alinement therewith. The fingers 17 are preferably moved inwardly against the bridges by means of cam surfaces on a rotatable ring (not shown).

The plungers 17 have oblique ends conforming to the taper of the cage. Said ends of the plungers are straight and are adapted to correct the bowing of the bridges and give the cage a true conical shape. The edge portions of the plungers are concave and are adapted to spread the flaps 13 and cause them to conform to the rollers 14. After the inner bearing member 16 has been placed in position with the rib 15 thereof below the small ends of the rollers, the plungers are caused to move radially against the bridges, which motion causes said bridges, together with the portions of the end members adjacent thereto, to move inwardly and forces the rollers into engagement with that portion of the member 16 between the end ribs thereof, which portion constitutes the roller raceway. The inward movement of the portions of the end members disposed opposite to the bridges forms crimped portions 18. The pressure of the plungers also corrects the bowing of the bridges and gives the cage the conical form desired. The wings are engaged by the plungers, and if the bridges are askew, the plungers, in forcing their way into the space between the wings, tend to straighten out the bridges and correct their alinement. The conical edges of the plungers cause the wings to conform to the rollers.

The process of assembling the bearing shown in Figs. 6 to 10 of the drawing is as follows: The end members 11ª at both ends of the cage, which is formed in any suitable manner, are of the same diameter before and after the closing in operation. In order to permit the insertion of the cone 16 between the rollers 14, the bridges 12ª are bowed outwardly longitudinally near the smaller end of the cage as shown best in Fig. 10; and, if the bridges are provided with flaps 13ª, the flaps of each bridge are preferably brought closer together, thus making larger pockets than are desired in the assembled bearing. The rollers 14 are then inserted in the pockets of the cage and the ribbed cone 16 is forced endwise thereof. The bearing is then placed in a die having radially movable fingers 17ª. The fingers are then forced inwardly in any suitable manner. This inward movement of the fingers causes their beveled inner edges to bear against all of the bridges simultaneously with a force sufficient to straighten out the bridges, and spread the flaps and cause them to conform to the rollers. This engagement of the flaps by the beveled edges of the fingers also tends to correct any misalinement of the bridges in the event that said bridges are slightly askew. It is noted that with the above arrangement the closing in operation extends the length of the bridges only; whereas, with the arrangement shown in Figs. 1 to 5, the closing in operation extends the entire length of the cage.

If the bridges have no wings, the pressure of the plungers on them corrects the bowing and causes the marginal portions thereof to conform to the rollers.

The hereinbefore described process simplifies the operation of assembling roller bearings, insures the proper alinement of the bridges so that the bearing will run properly, minimizes the necessity for scrapping cages because of the bridges being askew and conforms the wings accurately to the rollers.

What I claim is:—

1. The improvement in the manufacture of conical roller bearings which consists in punching, shearing and shaping a conical shell to form a cage with annular end members connected by longitudinally bowed bridges that are spaced apart and have marginal flaps which initially project outwardly, inserting conical rollers in the pockets of said cage and straightening said bridges and shaping the flaps thereof by the action of radially movable formers whose ends have a straight middle portion and concave edge portions adapted to press the flaps against the rollers and conform them to the curvature thereof.

2. The improvement in the manufacture of conical roller bearings which consists in punching, shearing and shaping a conical shell to form a cage with annular end members connected by longitudinally bowed bridges that are spaced apart and have marginal flaps which initially project outwardly, inserting conical rollers in the pockets of said cage and straightening said bridges and correcting misalinement thereof and spreading and shaping the flaps thereof by forcing said bridges nearly to the center line of the rollers and thereby forcing said flaps against said rollers.

3. The process of assembling roller bearings of the kind comprising an inner bearing member, a plurality of rollers and a retaining cage comprising annular end members connected by a plurality of bridges provided with flaps forming pockets for said rollers, which consists in initially forming said retaining cage of a larger diameter than is desired for the finished bearing with the flaps of said cage closer together than is desired for the finished bearing, placing the rollers in said pockets, placing said inner bearing member in position between said rollers, and then forcing the bridges of said cage radially inward a distance sufficient to retain said inner bearing member in position and spreading the flaps apart to conform them to the rollers and to correct misalinement of said bridges.

4. The improvement in the manufacture of conical roller bearings which consists in punching, shearing and shaping a conical shell to form a cage with annular end members connected by longitudinally bowed bridges, inserting conical rollers in the pockets of said cage and forcing said bridges radially inward to straighten them and upset the adjacent portions thereof against the rollers and thereby conform said portions to the curvature of the rollers.

Signed at Canton, Ohio, this 28th day of July, 1921.

ROY S. STOFFER.